United States Patent [19]

Pascucci

[11] Patent Number: 5,760,497
[45] Date of Patent: Jun. 2, 1998

[54] CHARGE PUMP CIRCUIT WITH MULTIPLE BOOST STAGES

[75] Inventor: Luigi Pascucci, Sesto San Giovanni, Italy

[73] Assignee: SGS-Thomson Microelectronics S.r.l., Agrate Brianza, Italy

[21] Appl. No.: 684,192

[22] Filed: Jul. 19, 1996

[30] Foreign Application Priority Data

Jul. 28, 1995 [EP] European Pat. Off. ............. 95830335

[51] Int. Cl.[6] ...................................... H02M 3/18
[52] U.S. Cl. .................... 307/110; 327/306; 327/536; 363/60
[58] Field of Search ........................... 307/109, 110; 331/57; 363/59, 60; 327/306, 536–538, 541

[56] References Cited

U.S. PATENT DOCUMENTS

| | | |
|---|---|---|
| 5,036,229 | 7/1991 | Tran ................................. 307/110 |
| 5,191,232 | 3/1993 | Wang ................................ 327/306 |
| 5,301,097 | 4/1994 | McDaniel ......................... 363/60 |
| 5,532,653 | 7/1996 | Adkins ............................. 327/537 |
| 5,574,634 | 11/1996 | Parlour et al. .................. 363/59 |
| 5,650,671 | 7/1997 | Pascucci et al. ................ 307/110 |

FOREIGN PATENT DOCUMENTS

A-0 461 717  12/1991  European Pat. Off. .

OTHER PUBLICATIONS

European Search Report from European Patent Application 95830335.6, filed Jul. 28, 1995.

*Primary Examiner*—Richard T. Elms
*Attorney, Agent, or Firm*—Wolf, Greenfield & Sacks, P.C.

[57] ABSTRACT

A charge pump circuit includes a plurality of voltage boost stages that are mutually parallel-connected between a supply line and an output line. Each of the stages includes first and second charge storing devices in each of which a first terminal is connected to a charge/discharge node and a second terminal is connected to a boost node to switch between a first charge state and a second charge state for transferring a charge to the output line. Each stage also includes an inverter with an input node connected to the boost node related to the first charge storing device and an output node which is connected to the boost node related to the second charge storing device. Further, a first charge transfer diode, which is connected between the charge/discharge node related to the first charge storing device and the output line and a second charge transfer diode, which is connected between the charge/discharge node related to the second charge storing device and the output line are also included in each stage. Each one of the voltage boost stages includes an additional diode that is connected between the charge/discharge node related to the first charge storing device and the output line. The additional diode discharges the first charge storing device when a potential of the output line is lower than a potential, minus the threshold of the additional diode, of the charge/discharge node related to the first charge storing device.

26 Claims, 7 Drawing Sheets

CHARGE PUMP CIRCUIT WITH MULTIPLE BOOST STAGES

BACKGROUND OF THE INVENTION

1. Field of the Invention

The present invention relates to a charge pump circuit with a multitude of boost stages.

2. Discussion of the Related Art

Charge pump circuits for generating a voltage at a given level (known as a boost voltage) starting from a supply voltage that is at a lower level, in order to supply a load arranged downstream of the charge pump circuit, and requiring a supply voltage higher than the one directly available from the supply line, are known in the art.

Charge pump circuits are based on the principle of alternating two separate steps: the first one includes charging a capacitor, and the second one includes raising a voltage of one terminal of the capacitor and connecting the other terminal to an output to achieve a voltage level that is higher than the power supply voltage.

A first solution, aimed at achieving a boost voltage higher than the supply voltage, is shown in FIG. 1, which illustrates the complete charge pump circuit, constituted by a plurality of identical stages that are shown in detail in FIG. 2. FIG. 1 thus shows a parallel connection of an odd number of voltage boost stages $2_i$, between a power supply line 1 and a voltage boost line 7. Each stage shown in FIG. 2 includes: a boost capacitor 3, in which the capacitor terminals form a first node 4 and a second node 5; an output diode 6, interposed between the second node 5 and the voltage boost line 7; a charge transistor 8, interposed between the supply line 1 and a second node 5 of a next stage $2_{i+1}$; a biasing diode 9, interposed between the supply line 1 and a node 10 formed by a gate terminal of the charge transistor 8; and an inverter 11, interposed between nodes 4 of two adjacent stages $2_i$, except for the last stage, which is formed by a branch comprising an AND gate 12 followed by a NOR gate 13 as shown in FIG. 1.

The inverters 11 and the NOR circuit 13 constitute a loop oscillator with an odd number of inversion cycles.

The above described charge pump circuit, of the type known as "single-stage", has the purpose of raising the voltage on the boost line 7 to a value that is twice the supply voltage $V_{DD}$ minus a threshold value $V_T$ caused by the drop across the diodes 6; in other words, a voltage equal to $2V_{DD}-V_T$ is obtained.

This value is purely theoretical, that is to say, it can be attained asymptotically in maximum efficiency conditions and if no current is absorbed.

If a steady-state voltage value varying between 4.5 and 5 volts is required from a supply voltage of 3 volts, and if a capacitance of a load to be driven has a modest value, the behavior of a "single-stage" pump is fully sufficient for the purpose.

On the contrary, if the capacitances downstream of the pump circuit are high, for example in the case of large memories (16-megabit memories with hierarchical decoders), and if high current consumption occurs, the asymptotic level that is possible with a "single-stage" pump can no longer be attained, or long time periods are required to attain it. Furthermore, with a pump of this type it is necessary to use capacitors having a very large value to allow the pump to deliver the required current. Efficient transfer of charge to the boost line in fact occurs if the capacitance values of the circuit are greater than the capacitance value connected to the boost line. Since this last capacitance value is already intrinsically high, this means that the capacitance values of the pump circuit must be even higher, with a consequent increase in parasitic effects, in network size, and in consumption.

It should also be noted that since the maximum value that can be reached in theory by the voltage with a single-stage pump is $2V_{DD}-V_T$, it is evident that when dealing with supply voltages on the order of 3 V, the loss of a threshold voltage (approximately 1 V) on a 3 V value is significant.

Accordingly, there is an interest in recovering the threshold voltage lost due to the drop across the diode 6.

One proposed solution to the above mentioned problems is the use of a so-called "two-stage" pump, in which the attainable asymptotic voltage value is $3V_{DD}-2V_T$. A general diagram of such a pump is shown in FIG. 3, whereas FIG. 4 is a detailed view of a single stage of the pump of FIG. 3.

The same reference numerals as used in FIGS. 1 and 2 are used, for identical components, in FIGS. 3 and 4, and these components are not further described.

The difference between the stage shown in FIG. 4 and the stage of FIG. 2 resides in the presence of a first charge transfer diode 14 and of a second charge transfer diode 15.

Reference is made to EPA 94830030.6 in the name of the same Applicant, herein incorporated by reference, for a detailed description of the pump circuit of FIG. 1 and of the pump circuit of FIG. 3. The voltage produced by the circuit of FIG. 3 is $3V_{DD}-2V_T$.

The drawback of a circuit of this so-called "two-stage" type is the fact that although it assuredly attains a higher voltage level than the pump shown in FIG. 1 (in which the asymptotic value is $2V_{DD}-V_T$) and is more efficient at that level, it has a higher overall impedance. Increasing the number of stages increases the voltage due to the contribution of each stage, while at the same time there is a power loss too. That is to say, it is no longer possible to generate the same current. If one seeks to raise the voltage but at the same time to drive considerable loads, this solution is not adapted, since the circuit is unable to deliver high maximum current values. Therefore there is a disadvantage in the initial step, since the boosting of the boost line is slowed down, and there is a disadvantage in the long term, since the circuit is unable to deliver the required current although it achieves the desired voltage.

SUMMARY OF THE INVENTION

A principal aim of the present invention is therefore to provide a charge pump circuit that overcomes the drawbacks mentioned above, allowing the charge pump circuit to continuously achieve a high voltage level (boost voltage) in a short time and with maximum efficiency.

Within the scope of this aim, an object of the present invention is to provide a charge pump circuit that delivers maximum power during startup and in the initial step.

Another object of the present invention is to provide a charge pump circuit that is more efficient from the point of view of overall impedance and therefore has a better current delivery capability.

Another object of the present invention is to provide a charge pump circuit having a low capacitance with respect to known solutions.

Another object of the present invention is to provide a charge pump circuit usable to drive large loads that require considerable current absorption.

Another object of the present invention is to provide a charge pump circuit that is highly reliable and relatively easy to manufacture at competitive costs.

This aim, these objects, and others which will become apparent hereinafter are achieved by a charge pump circuit which, in one embodiment, comprises a plurality of voltage boost stages that are mutually parallel-connected between a supply line and an output line. Each one of the stages comprises: first and second charge storing means in each of which a first terminal is connected to a charge/discharge node and a second terminal is connected to a boost node to switch between a first charge state and a second charge state for transferring a charge to the output line; an inverter, in which an input node is connected to the boost node that is related to the first charge storing means and an output node connected to the boost node that is related to the second charge storing means; a first charge transfer transistor, which is connected between the charge/discharge node related to the first charge storing means and the output line; a second charge transfer transistor, which is connected between the charge/discharge node related to the second charge storing means and the output line. Each one of the stages includes an additional transistor connected between the charge/discharge node related to the first charge storing means and the output line, the additional transistor discharging the first charge storing means when a potential of the output line is lower than a potential, minus a threshold of the additional transistor, of the charge/discharge node related to the first charge storing means.

Another embodiment of the invention is directed towards a voltage boosting circuit including an output terminal, a first charge storing device and a second charge storing device. The circuit also includes a first charging means for charging the first charge storing device to a first charge level, and a second charging means for charging the second charge storing device to a second charge level. In addition, a first means for coupling the first charge on the first charge storing device to the output terminal when an output potential on the output terminal is less than a first predetermined value is provided. The voltage boosting circuit also includes second means for coupling the first charge on the first charge storing device to the second charge storing device when the output potential is not less than the first predetermined value and third means for coupling the second charge on the second charge storing device to the output terminal.

Another embodiment of the invention is directed towards the method for generating an output voltage on an output line from a supply voltage on a supply line, the output voltage greater than the supply voltage, comprising steps of charging a first charge storing device to a first charge level, coupling the first charge on the first charge storing device to the output line when an output potential value on the output line is less than a first predetermined value, coupling the first charge on the first charge storing device to a second charge storing device when the output potential value is not less than the first predetermined value, charging the second charge storing device to a second charge level, and coupling the second charge on the second charge storing device to the output line.

BRIEF DESCRIPTION OF THE DRAWINGS

Further characteristics and advantages of the present invention will become apparent from the description of a preferred but not exclusive embodiment of the circuit according to the present invention, illustrated only by way of non-limiting example in the accompanying drawings, wherein.

DETAILED DESCRIPTION

FIGS. 1–4 are diagrams of two known and previously described charge pump circuits.

Figure 6:
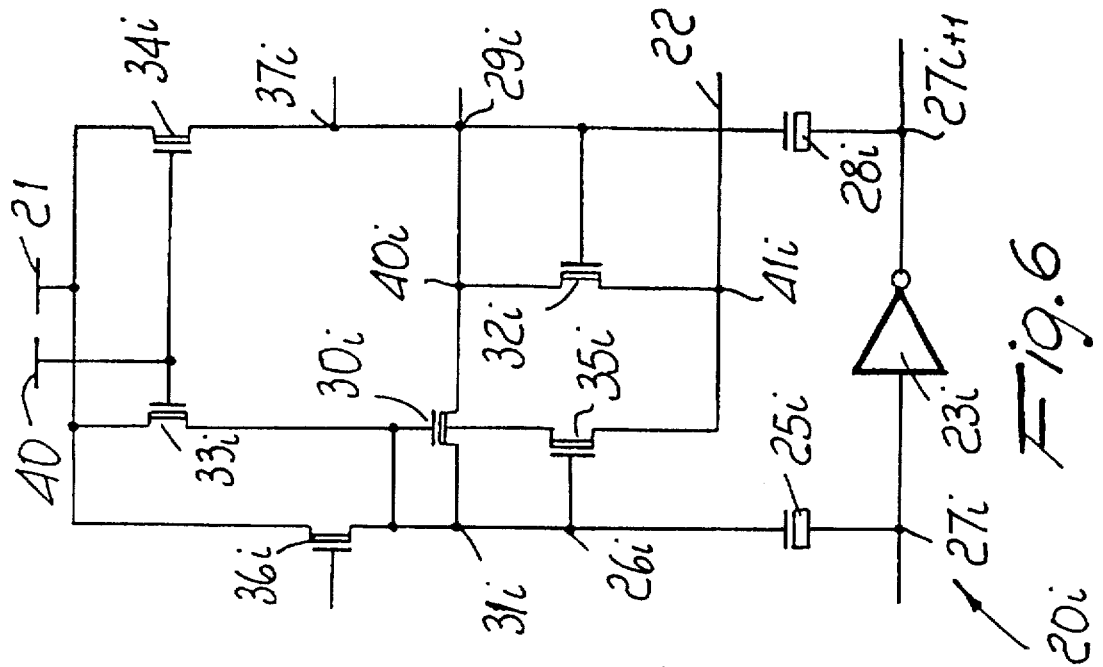
FIG. 6 is a detailed view of the circuit diagram of one of the stages of the charge pump circuit according to the present invention, shown in FIG. 5.
Figure 4:
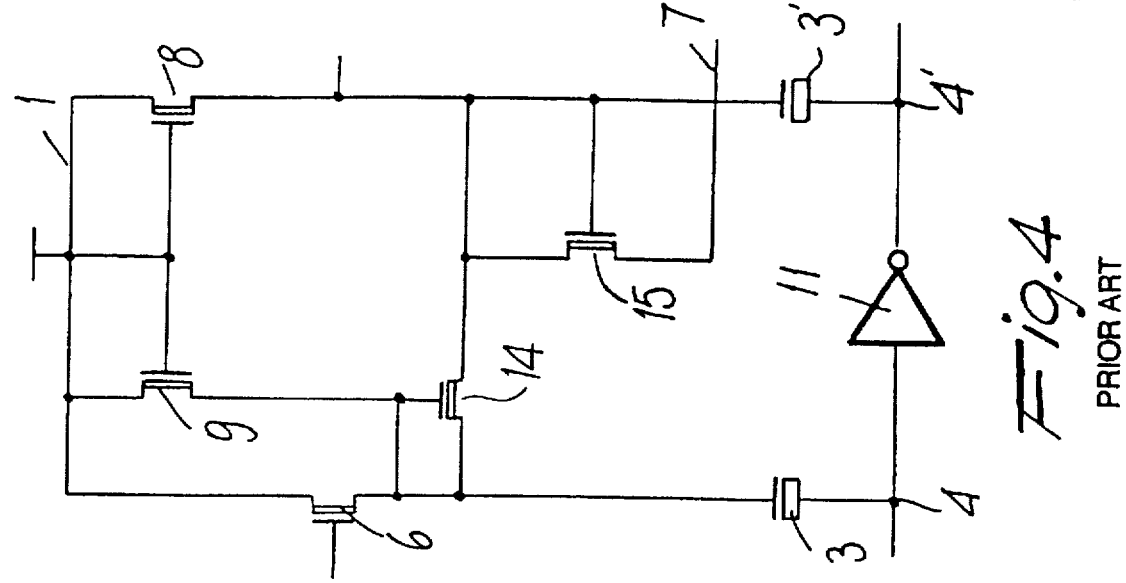
FIG. 4 is a detailed view of the circuit diagram of one of the stages of the charge pump shown in FIG. 3.
Figure 2:
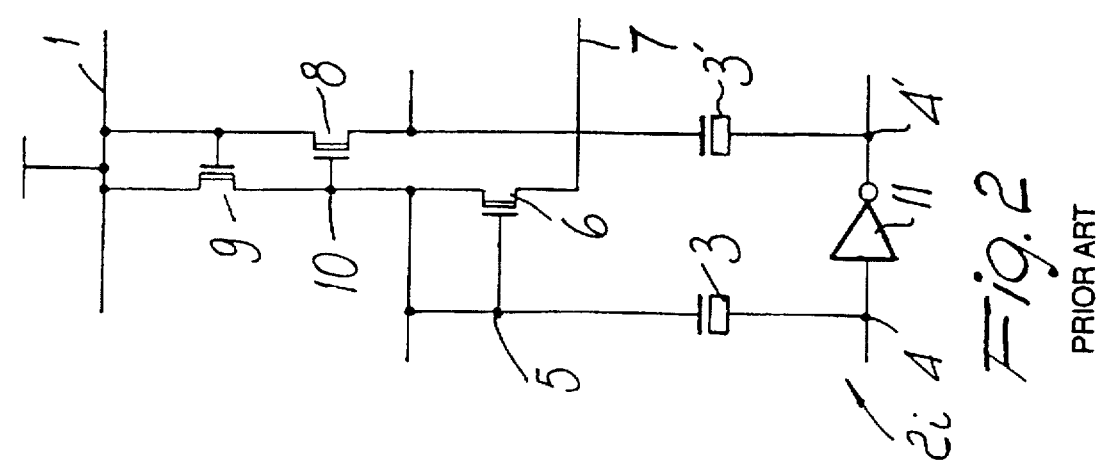
FIG. 2 is a detailed circuit diagram of one of the stages of the charge pump shown in FIG. 1.
Figure 5:
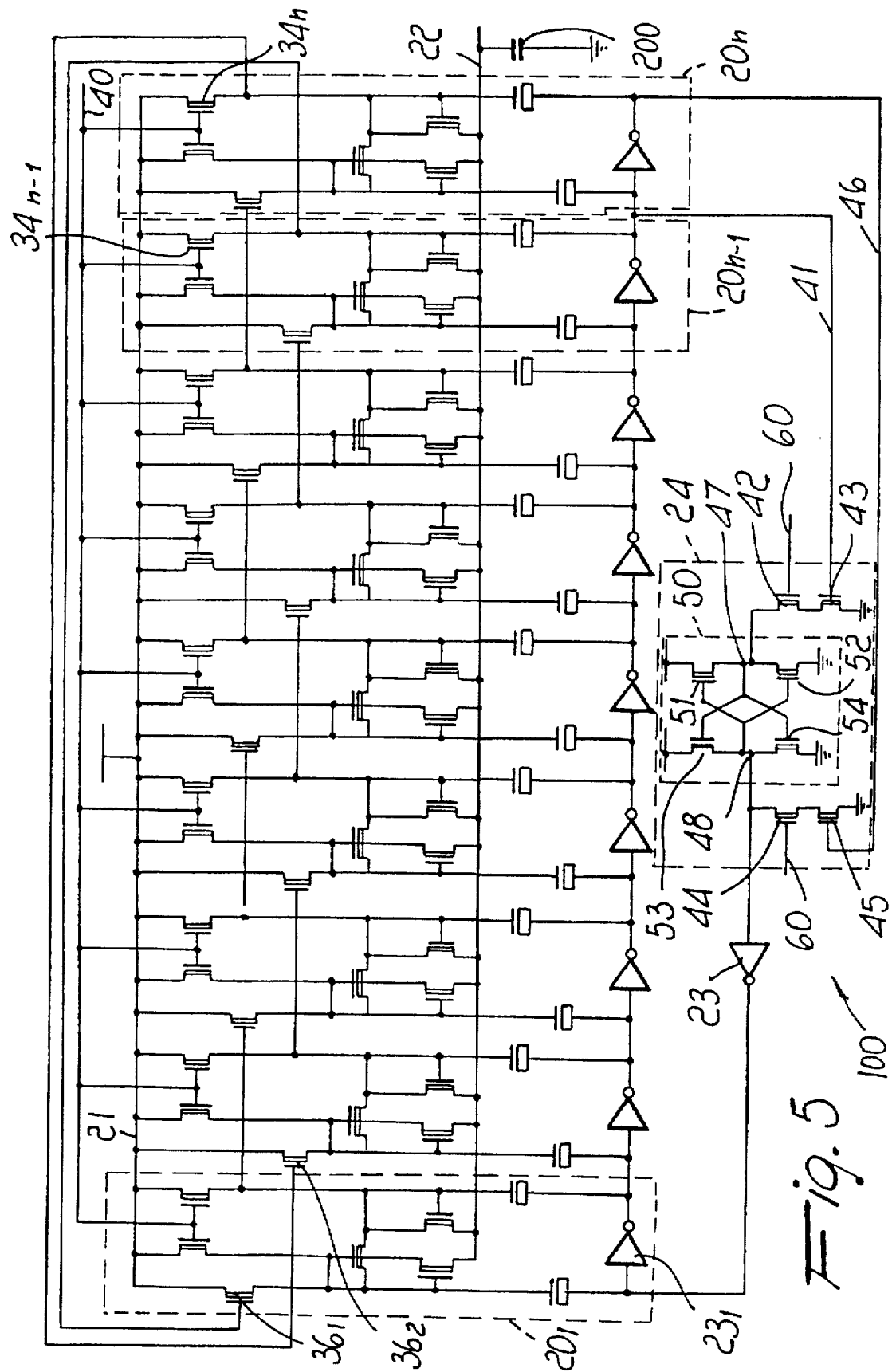
FIG. 5 is a circuit diagram of a charge pump circuit according to the present invention.

With reference to FIGS. 5 and 6, the charge pump circuit according to the present invention, generally designated by the reference numeral 100, includes a series of stages $20_1$, $20_2$, ..., $20_{n-1}$, $20_n$ (where n is an odd number) that are mutually parallel-connected between a supply line 21 at a voltage $V_{DD}$ and an output line 22 (boost line). A loop oscillator, constituted by a plurality of mutually identical inverters $23_1$, $23_2$, ..., $23_{n-1}$, $23_n$ and by a flip-flop circuit 24, is coupled to the output line. It should be noted that the use of the terms "connected" and "coupled" indicates an electrical connection between two elements and can include an intervening element between the two "coupled" or "connected" elements.

A capacitor 200 is connected to the output line 22 and represents a capacitive load to be driven by the charge pump circuit 100.

The configuration of a stage $20_i$ is shown in detail in FIG. 6. Each stage $20_i$ includes a first charge storing device, advantageously constituted by a bootstrap capacitor $25_i$, the terminals whereof constitute a first node $31_i$ and a second node $27_i$.

Each inverter $23_i$ is connected between an input node, which corresponds to the second node $27_i$, and an output node $27_{i+1}$. The output node $27_{i+1}$ coincides with the input node of the inverter $23_{i+1}$ of a successive stage, whereas the input node $27_i$ coincides with the output node of the inverter $23_{i-1}$ of a preceding stage.

A second charge storing device, which is advantageously constituted by a capacitor $28_i$, has a first terminal connected to the output node $27_{i+1}$ and a second terminal forming a node $29_i$.

A first charge transfer transistor $30_i$ is connected between the nodes $31_i$ and $29_i$. A second charge transfer transistor $32_i$ is connected between a node $40_i$ and a node $41_i$ on the boost line 22.

Advantageously, the first transistor $30_i$ and the second transistor $32_i$ include native N-channel MOS transistors, that is to say, transistors having a low threshold and in which the drain and gate terminals are shorted together.

A third biasing transistor $33_i$, conveniently constituted by a native N-channel MOS transistor, has its drain terminal connected to the supply line 21 and its source terminal connected to a gate terminal of the first transistor $30_i$.

A fourth biasing diode $34_i$, advantageously constituted by a native N-channel MOS transistor, has its drain terminal connected to the supply line 21 and its source terminal connected to the circuit branch that includes the node $29_i$, the capacitor $28_i$, and the node $27_{i+1}$. A gate terminal of the transistor $32_i$ is connected to the above mentioned circuit branch and therefore to the source terminal of the transistor $34_i$.

Gate terminals of the transistors $33_i$ and $34_i$ are connected to each other.

A fifth transistor $35_i$ is connected, by means of its gate terminal, to the circuit branch that connects the node $27_i$ to the node $31_i$ forming a node $26_i$. A source terminal of the transistor $35_i$ is connected to the boost line 22, whereas its drain terminal is connected to the source terminal of the transistor $33_i$. The transistor $35_i$ is also advantageously provided as a native N-channel MOS transistor.

A sixth transistor $36_i$ is connected to the supply line 21 by means of its drain terminal and to the node $31_i$ by means of its source terminal.

A node $37_i$ is formed between the source terminal of the transistor $34_i$ and the node $29_i$, and a gate terminal of a transistor $36_{i+1}$ belonging to a successive stage $20_{i+1}$ is connected to said node $37_i$.

Likewise, a gate terminal of the transistor $36_i$ is connected to a node $37_{i-1}$ belonging to a preceding stage $20_{i-1}$.

FIG. 5 shows the parallel connection of an odd number of stages $20_i$ and a connection of the last stage $20_n$, in which a source terminal of the transistor $34_n$ is connected to a gate terminal of the transistor $36_2$ of a second stage $20_2$.

The source terminal of the transistor $34_{n-1}$ belonging to the penultimate stage $20_{n-1}$ is connected to a gate terminal of a transistor $36_1$ belonging to the first stage $20_1$.

Likewise, the source terminal of the transistor $34_i$ of a generic stage $20_i$ is instead connected to the gate terminal of the transistor $36_{i+2}$ of a stage $20_{i+2}$.

The mutually connected gate terminals of the transistors $33_i$ and $34_i$ are connected, for each stage, to a control line 40 for enabling the pump circuit. The control line 40 disconnects the transistors $33_i$ and $34_i$ from the power supply $V_{DD}$ if one wishes to leave the level of the boost line 22 unchanged, so as to then set the boost line 22 to the ground level if required.

The output node $27_{i+1}$ of the penultimate stage $20_{n-1}$ is connected, by means of a line 41, to a gate terminal of a transistor 43 belonging to a first pair of transistors 42 and 43 that are included in the flip-flop 24.

The output node $27_{i+1}$ of the last stage $20_n$ is connected, by means of a line 46, to a gate terminal of a transistor 45 belonging to a second pair of transistors 44 and 45.

As regards the first pair of transistors, a gate terminal of the transistor 42 is connected to a regulator line 60 for regulating the pump circuit 100 and a source terminal of the transistor 42 is connected to a drain terminal of the transistor 43. A source terminal of the transistor 43 is connected to a ground and a drain terminal of the transistor 42 is connected to a node 47 of a latch circuit 50.

The flip-flop circuit 24 has a purpose of interrupting operation of the charge pump circuit by freezing the last propagation that is occurring in the loop oscillator constituted by the inverters $23_i$.

As regards the second pair of transistors 44 and 45, a gate terminal of the transistor 44 is connected to the regulator line 60 of the pump circuit 100, a drain terminal of the transistor 45 is connected to a source terminal of the transistor 44, and the source terminal of transistor 45 is connected to ground. A drain terminal of the transistor 44 is connected to a circuit branch connecting a second node 48 of the latch circuit 24 to an input node of an inverter 23, an output of the inverter 23 whereof is connected to the input node $27_1$ of the first stage $20_1$ of the charge pump circuit 100.

Advantageously, the latch circuit comprises two pairs of MOS transistors. The first pair is formed by transistors 51 and 52, and the second pair is formed by transistors 53 and 54. A gate terminal of the transistor 53 is connected to a gate terminal of the transistor 54, and both gates are connected to the node 47. A gate terminal of the transistor 51 is connected to the gate terminal of the transistor 52, and both are connected to the node 48. Drain terminals of the transistors 51 and 53 are connected to the supply voltage $V_{DD}$ and source terminals of the transistors 51 and 53 are respectively connected to the drain terminals of the transistors 52 and 54. Finally, source terminals of the transistors 52 and 54 are connected to ground.

With reference to FIGS. 5 and 6, the operation of the charge pump circuit 100 according to the invention is as follows.

Assume that a generic node $27_i$ is low; in this case, the associated capacitor $25_i$ begins to be precharged to the supply voltage $V_{DD}$ by means of the transistor $36_i$, which has, from the preceding stage $20_{i-1}$, a voltage higher than $V_{DD}$ at its gate terminal, thus allowing the node $26_i$ to be connected to the supply $V_{DD}$ by means of the transistor $36_i$. Then, when the node $27_i$ goes high, a further boosting by a voltage $V_{DD}$ occurs and the node $31_i$ reaches the level $2V_{DD}$.

The capacitor $25_i$ could therefore transfer onto the boost line 22 a charge equal to $2V_{DD}-V_T$, that is to say, a charge reduced by a threshold voltage $V_T$ of the transistor $35_i$ if the level of the boost line 22 is lower than $2V_{DD}-V_T$.

If the level present on the boost line 22 is sufficiently lower than $2V_{DD}-V_T$, then the capacitor $25_i$ discharges onto said boost line 22. When the level of the boost line approximates or equals the charge level $2V_{DD}-V_T$, the charge of the node $31_i$ discharges onto the node $40_i$ (whose maximum possible level in this step is $V_{DD}$), which thus has the same charge as the node $29_i$.

The step for the discharge of the capacitor $25_i$ is followed by the step for precharging the capacitor $28_i$ when the nodes $27_{i+1}$ go low. A voltage boost of one $V_{DD}$ is thus supplied to the node $29_i$ by means of the transistor $34_i$. The node $29_i$ is thus charged at $3V_{DD}-V_T$ and discharges onto the boost line 22, minus a threshold $V_T$ determined by the transistor $32_i$. The transfer of a charge equal to $3V_{DD}-2V_T$ onto the boost line has thus been achieved.

This sequence of steps is repeated for each stage $20_i$ of the loop oscillator.

As long as the value of the boost line is sufficiently lower than $2V_{DD}-V_T$, the pump circuit behaves like a single-stage pump, transferring charge to the boost line 22. When the level reached by said boost line is too high for further charge transfer to occur, that is to say, when a balance is reached, then it is not necessary to wait for discharge to continue transferring charges, but the second section of the stage $20_i$ of the pump circuit automatically becomes active and behaves, in this step, like a two-stage pump and is able to transfer charges to the boost line 22 by virtue of the higher voltage difference ($3V_{DD}-2V_T$).

This "two-stage" behavior thus engages after the "single-stage" behavior of the pump circuit in a gradual and progressive manner, until it becomes exclusively of the two-stage type only if the desired level is greater than, or equal to, $2V_{DD}-V_T$.

If the output node of the inverter $23_n$ of the last stage $20_n$ has a low value (0), this value is transmitted over the line 46, is inverted by the two transistors 44 and 45, and is inverted again by he inverter 23; therefore, a high value (1) is present at the node $27_1$ in the subsequent cycle. During this step, a 0 is present at the gate terminal of the transistor 43 and the transistors 42 and 43 are off. When a 1 is present on the line 41, the transistors 42 and 43 are on and the transistors 44 and 45 are off.

Figure 1:
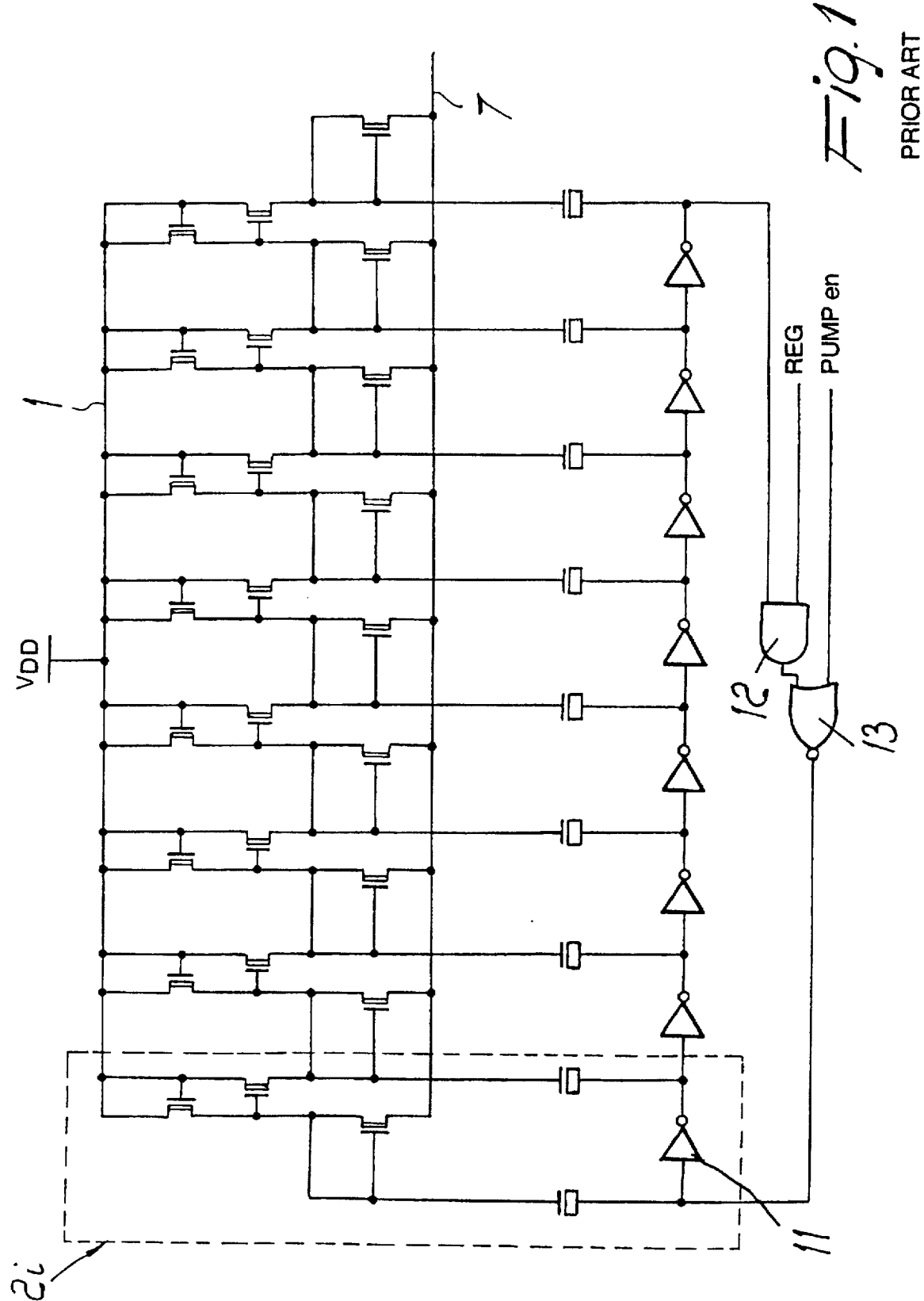
FIG. 1 is a circuit diagram of a charge pump circuit with a plurality of stages of a first known type.
Figure 3:
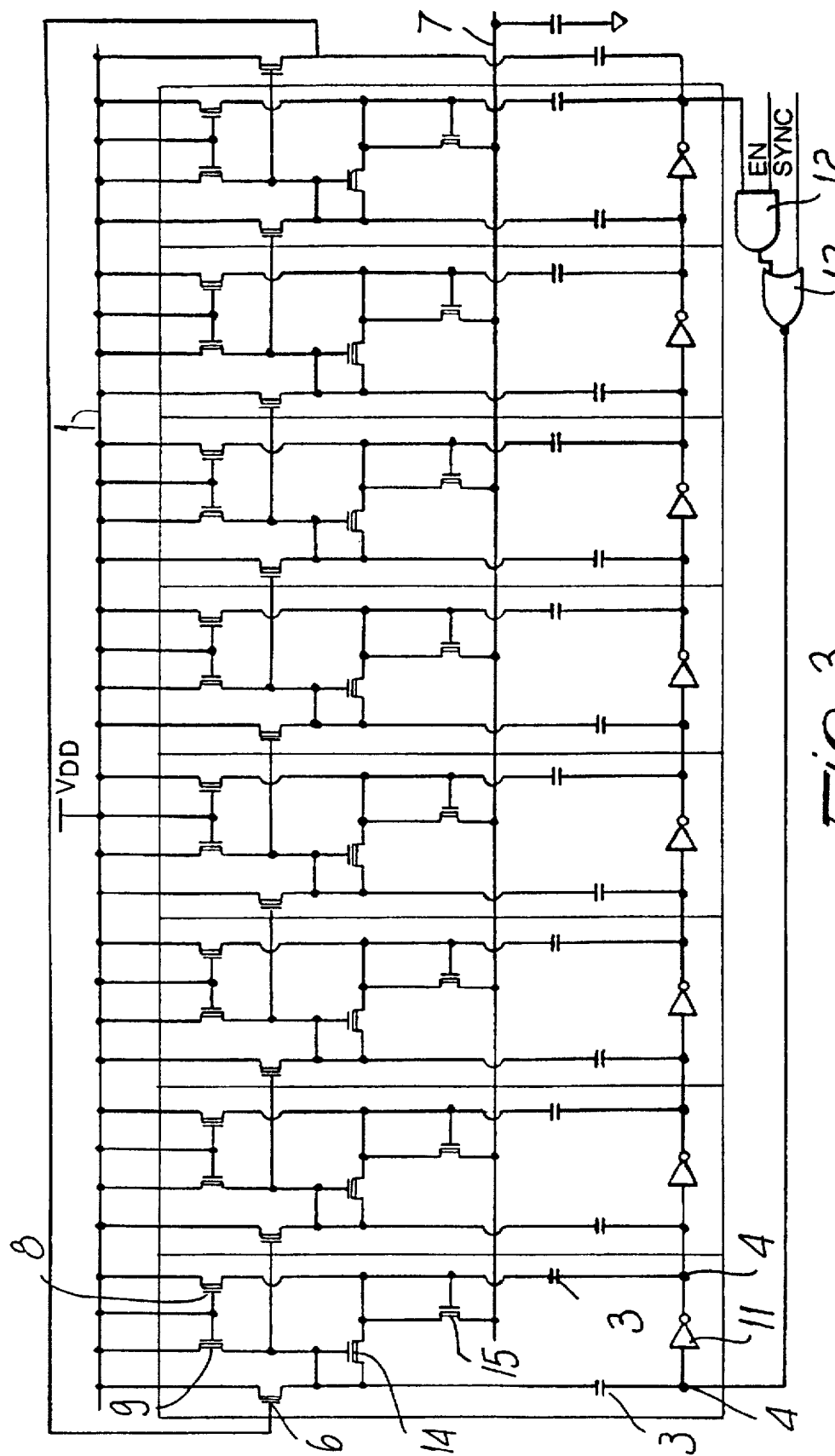
FIG. 3 is a circuit diagram of a second known type of multiple-stage charge pump circuit.

The advantage of using a flip-flop configuration of this type with respect to the circuit with an AND gate 12 and a NOR gate 13 of the known embodiments of FIGS. 1 and 3 is due to the following reason. Assume that the output of the AND gate 12 is a low signal (0) and that the SYNC signal is low (0); in this case, a high signal (1) is present in output from the NOR gate 13 and therefore the first node $27_1$ of the charge pump circuit is high (1) and another high level (1) is present at the output node of the last stage $20_n$ and is inverted by the NOR gate 13; therefore, a low level (0) will be present at the subsequent cycle on the first node $4_1$ of the pump circuit and will begin to propagate, with its inversion cycles, by means of the inverters $23_i$.

At this point, assume that the output signal from the AND gate 12 goes low and that therefore the output signal from the NOR gate 13 becomes suddenly high.

Since the nodes $4_i$ of the pump circuits of FIGS. 1 and 3 correspond to the nodes $27_i$ of the circuit according to the invention, this last reference numeral is used for the sake of simplicity.

Therefore, it might occur that while the signal has not yet reached the output node of the last stage, that is to say, the inversion cycle has not yet completed, a new inversion cycle may overlap on said cycle that has already begun, leading to a non-synchronized effect.

With the solution of the flip-flop 24 adopted in the circuit according to the present invention, this drawback is eliminated, since the flip-flop 24 interrupts the operation of the pump, freezing the last propagation that is occurring in the loop oscillator.

Figure 7:
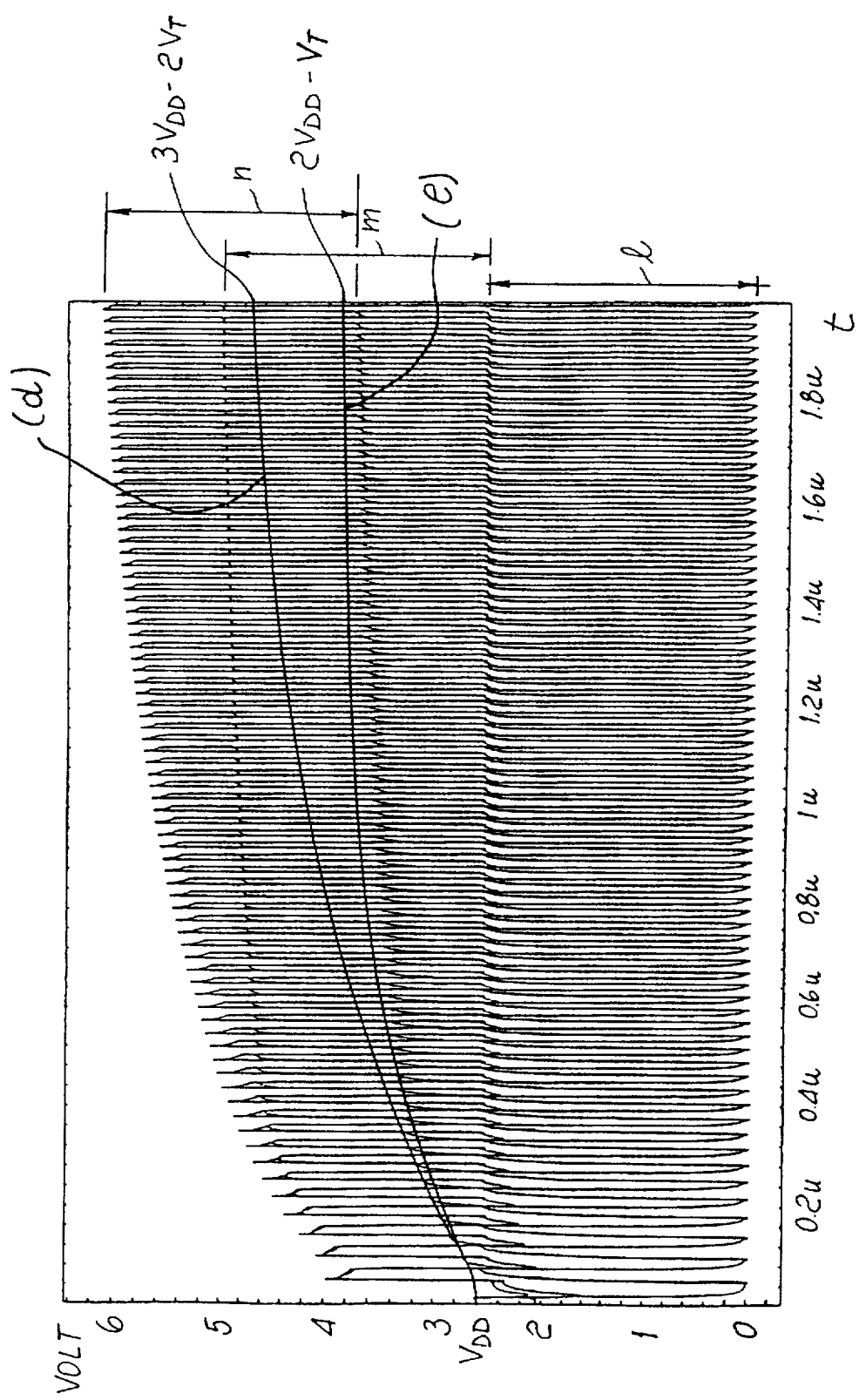
FIG. 7 is a graph comparing voltage levels obtainable with a known single-stage charge pump circuit and with a pump circuit according to the present invention, shown respectively in FIGS. 1 and 5.

The graph of FIG. 7 plots a comparison between the asymptotic value $2V_{DD}-V_T$ that can be attained with a single-stage pump (curve e) and the oscillating behavior of the nodes $27_i, 31_i$, and $40_i$, showing the asymptotic value that can be attained in theory by the pump according to the invention (curve d). The letter l designates the regular oscillation performed by the node $27_i$ which, starting from zero, reaches $V_{DD}$ at the most; the letter m designates the oscillation of the node $31_i$ which starts from the level $V_{DD}$ and reaches at the most the level $2V_{DD}$; and the letter n designates the oscillation of the node $40_i$.

The graph clearly shows that initially, during startup, starting from the voltage $V_{DD}$, the two curves d and e tend to overlap and to be identical; then the curve d prevails, and its value tends to $3V_{DD}-2V_T$.

Figure 8:
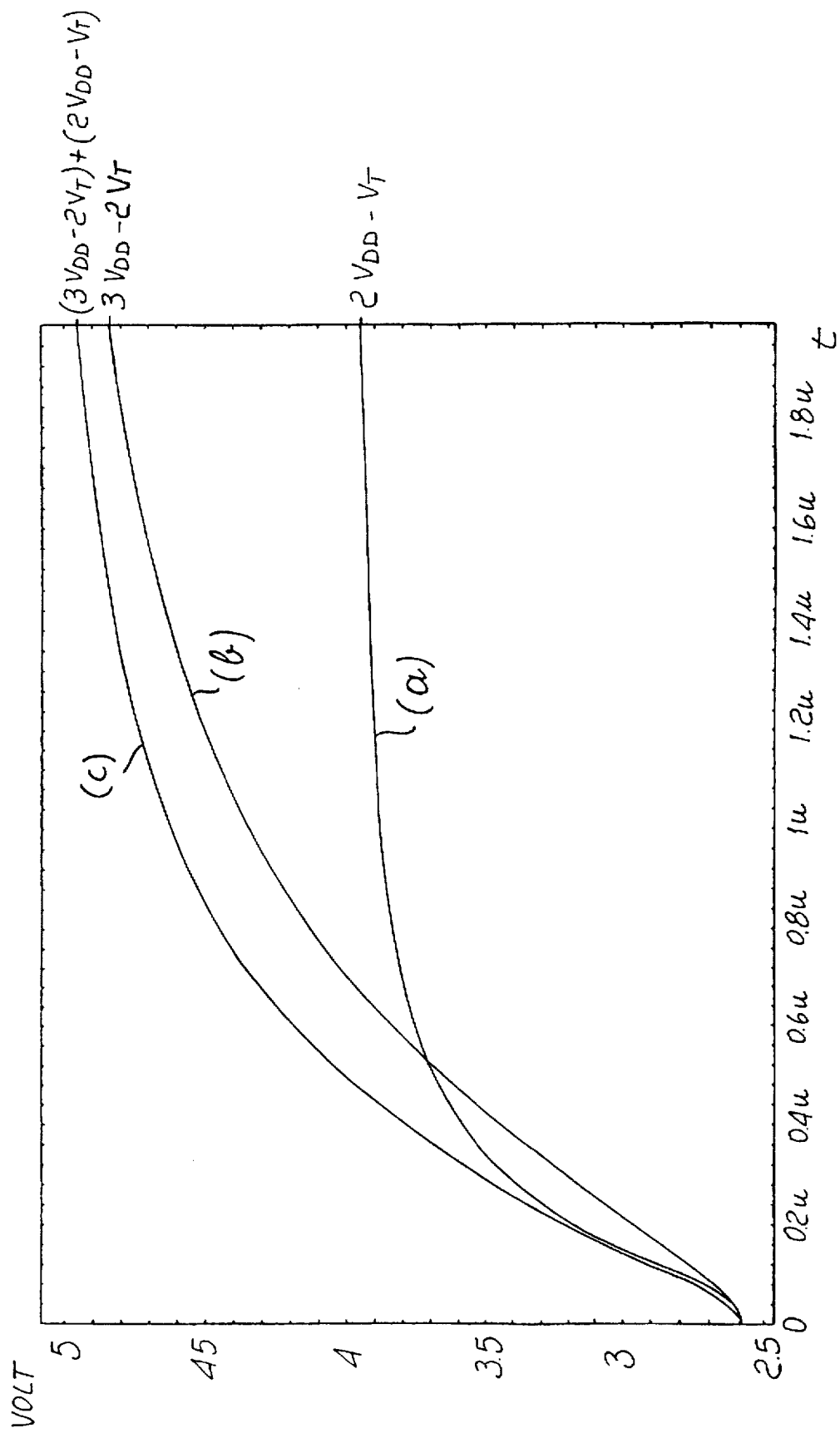
FIG. 8 is a graph comparing voltage levels obtainable with the known circuit solutions of FIGS. 1 and 3 and with the charge pump according to the present invention.

FIG. 8 is a graph that compares the voltage levels, as a function of time, obtainable with the pump configurations of the single-stage type, of the two-stage type, and according to the present invention.

The curve designated by (a) relates to the behavior of a single-stage pump, in which the attainable asymptotic voltage value is $2V_{DD}-V_T$; curve (b) relates to the behavior of a two-stage pump, in which the attainable asymptotic value is $3V_{DD}-2V_T$; and curve (c) plots the voltage level that can be attained by a pump circuit according to the invention.

The graph clearly shows that during startup, curve (a) lies above curve (b) and practically coincides with curve (c). As can be seen, the single-stage pump is initially more efficient than the two-stage pump. Then, after a certain time, the behavior of curve (b) prevails and tends to reach a higher asymptotic level than curve (a).

The trend of curve (c) is instead always higher than curves (a) and (b), although it then tends asymptotically towards the same value as curve (b).

It is thus evident that the pump circuit according to the invention, during startup, behaves like a single-stage pump and then becomes a two-stage pump, but with an efficiency that is always higher than that of a conventional two-stage pump.

Figure 9:
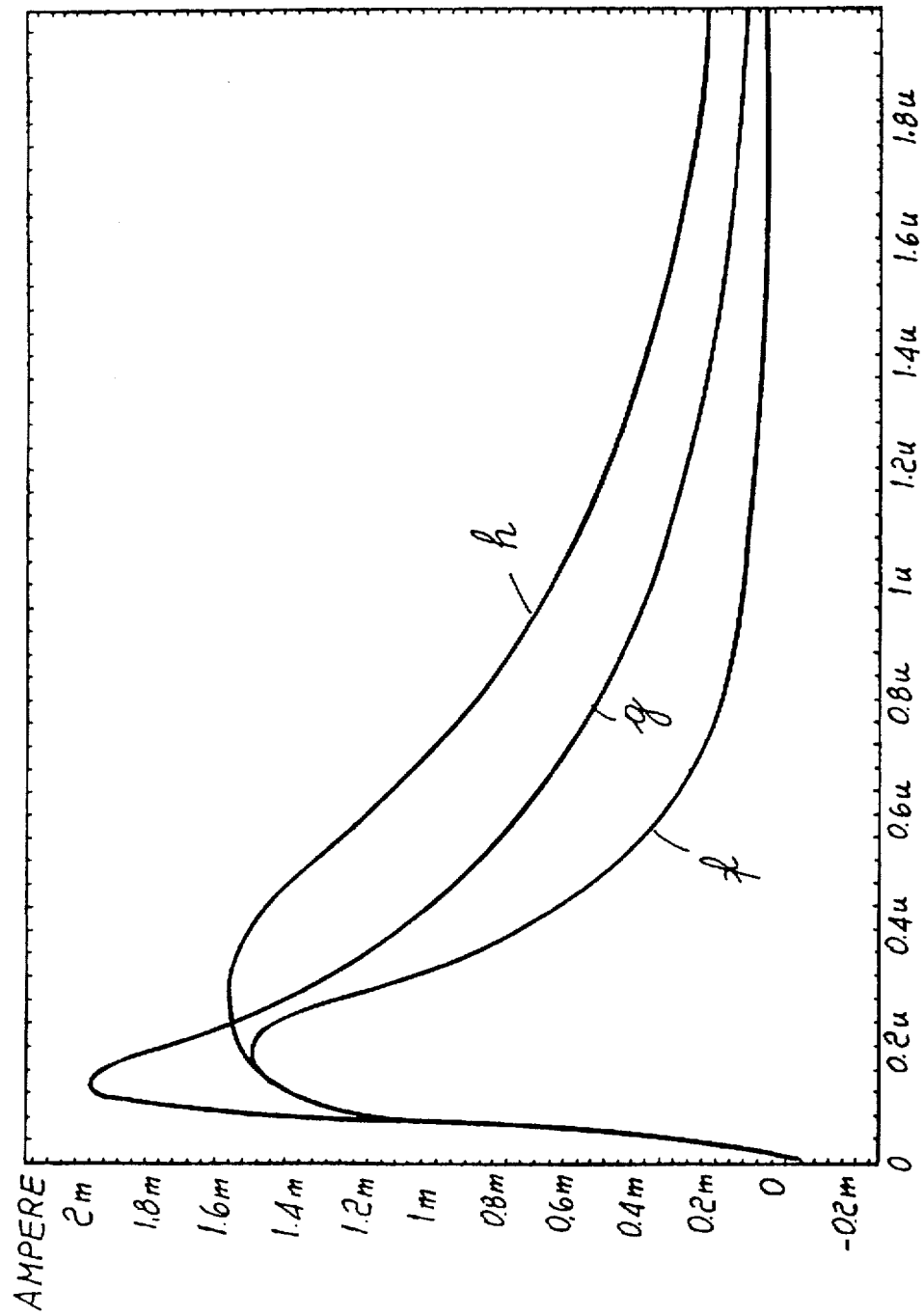
FIG. 9 is a graph comparing a current level that can be produced as a function of time by the two known charge pump circuits of FIGS. 1 and 3 and by the charge pump circuit according to the present invention.

FIG. 9 is a graph that compares the current levels obtainable, as a function of time, by the two known types of charge pump circuit and by the circuit according to the invention. In this graph, curve (f) relates to the current obtainable from a charge pump circuit of the "single-stage" type and therefore with high startup efficiency (high deliverable current) and with a sudden decrease in efficiency after a short period of time.

Curve (h) shows the behavior of a "two-stage" charge pump circuit, with low initial efficiency due to the high impedance and with a later improvement (curve h passes above curve f). Finally, curve (g) plots the behavior of the circuit according to the present invention, in which there is a high startup current value (equal to the curve f) and then there is a subsequent value that is in an intermediate position between curve (f) and curve (h).

The apparent reduction in the current delivered by the pump circuit according to the present invention (curve f) with respect to the two-stage pump (curve h) should not mislead, since this is due to the fact that the level attained, after an equal time, by the pump according to the invention is higher than the level reached by the two-stage pump and therefore the ability to deliver current decreases. Every pump in fact stops delivering current when it theoretically reaches its asymptotic level.

Since one wishes to obtain a voltage of 4–4.5 volts starting from a supply voltage $V_{DD}$ equal to 2.7–3V, it is necessary to use a regulator to limit the voltage reached by the boost line. For this purpose, a regulator (not shown) is connected to the regulation line 60, so as to pump charges on the boost line, if required, and stop the charge pump circuit 100 when the desired voltage level is reached.

In practice it has been observed that the charge pump circuit according to the present invention fully achieves the intended aim, since it provides a voltage multiplier of the type with dual behavior, initially of the "single-stage" type, with an attainable asymptotic voltage level equal to $2V_{DD}-V_T$, and then of the "two-stage" type, with an attainable asymptotic voltage level equal to $3V_{DD}-2V_T$. This behavior of the charge pump circuit has the advantage that during the initial part, that is to say at startup, the circuit behaves like a single-stage pump, and therefore has a low impedance, allowing to quickly reach a relatively high voltage level. Then, when in theory the discharge step would end due to the rise in the voltage level of the boost line, the pump gradually becomes a two-stage pump, so as to therefore maintain good efficiency in a step in which the single-stage pump would be ineffective.

Therefore, an additional advantage of the pump circuit according to the invention is provided by the fact that the impedance remains constantly lower than in the single-stage solution and in the two-stage solution, allowing delivery of a higher current value than the single-stage case.

Another important advantage arises from the possibility of restoring the desired voltage level if a load connected to the boost line absorbs current since the charge pump circuit according to the present invention maintains the desired level, furthermore providing the ability to deliver current.

Finally, the improved performance of the charge pump circuit allows smaller sizes and values for the capacitors used in the circuit.

Having thus described at least one illustrative embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A charge pump circuit, comprising:
   a supply line;
   an output line; and
   a plurality of voltage boost stages mutually parallel connected to the supply line and to the output line, wherein each one of the plurality of voltage boost stages comprises:
   first charge storing means for storing a charge, the first charge storing means having a first terminal connected to a first charge/discharge node and a second terminal connected to a first boost node;
   second charge storing means for storing a charge, the second charge storing means having a third terminal connected to a second boost node and a fourth terminal connected to a second charge/discharge node;
   an inverter having an input connected to the first boost node of the first charge storing means and an output connected to the second boost node of the second charge storing means;
   a first charge transfer transistor connected between the first charge/discharge node of the first charge storing means and the second charge/discharge node of the second charge storing means;
   a second charge transfer transistor connected between the second charge/discharge node of the second charge storing means and the output line; and
   an additional transistor, having a threshold voltage, connected between the first charge/discharge node of the first charge storing means and the output line, the additional transistor arranged to discharge the first charge storing means when a potential of the output line is lower than a potential of the first charge/discharge node of the first charge storing means minus the threshold voltage of the additional transistor.

2. The circuit according to claim 1, wherein each one of the plurality of boost stages further comprises a third biasing transistor interposed between the supply line and the first charge transfer diode.

3. The circuit according to claim 2, wherein each one of the plurality of boost stages further comprises a fourth biasing transistor interposed between the supply line and the second charge/discharge node of the second charge storing means.

4. The circuit according to claim 3, wherein each one of the plurality of boost stages further comprises a fifth transistor connected between the supply line and the first charge/discharge node of the first charge storing means, the fifth transistor being of an N-channel MOS low-threshold type.

5. The circuit according to claim 2, wherein in each one of the plurality of boost stages, the additional transistor comprises an N-channel MOS low-threshold transistor having a drain terminal connected to a source terminal of the third biasing transistor.

6. The circuit according to claim 3, wherein in each one of the plurality of boost stages, the first and second charge transfer transistor and the third and fourth biasing transistor each comprises an N-channel MOS low-threshold transistor.

7. The circuit according to claim 3, wherein in each one of the plurality of boost stages, gate terminals of the third and fourth biasing transistor are connected to an enabling control line.

8. The circuit according to claim 4, wherein the plurality of voltage boost stages includes N voltage boost stages, $VBS_i$, wherein i=1 to N, and wherein N is an integer greater than 1; and
   wherein the plurality of voltage boost stages are connected in series in an order such that voltage boost stage, $VBS_x$, is connected to voltage boost stage $VBS_{x+1}$, wherein x=1 to N−1, and wherein a source terminal of the fourth biasing transistor of voltage boost stage $VBS_y$, of the plurality of voltage boost stages, is connected to a gate terminal of the fifth transistor of voltage boost stage $VBS_z$ of the plurality of voltage boost stages wherein y and z are each an even integer.

9. The circuit according to claim 4, wherein the plurality of voltage boost stages includes N voltage boost stages, $VBS_i$, wherein i=1 to N, and wherein N is an integer greater than 1; and
   wherein the plurality of voltage boost stages are connected in series in an order such that voltage boost stage, $VBS_x$, is connected to voltage boost stage $VBS_{x+1}$, wherein x=1 to N−1, and wherein a source terminal of the fourth biasing transistor of voltage boost stage $VBS_a$, of the plurality of voltage boost stages, is connected to a gate terminal of the fifth transistor of voltage boost stage $VBS_b$ of the plurality of voltage boost stages wherein a and b are each an odd integer.

10. The circuit according to claim 1, wherein the plurality of voltage boost stages includes N voltage boost stages, $VBS_i$, wherein i=1 to N, and wherein N is an integer greater than 1; and
    wherein the plurality of voltage boost stages are connected in series in an order such that voltage boost stage $VBS_x$, is connected to voltage boost stage $VBS_{x+1}$, wherein x=1 to N−1, the circuit further comprising:
    a first flip-flop transistor having a source terminal connected to ground and a gate terminal;
    a second flip-flop transistor having a drain terminal and a gate terminal to receive a regulator signal; and
    a latch circuit having an input connected to the drain terminal of the second flip-flop transistor and an output;
    wherein the output of the inverter of the voltage boost stage $VBS_{N-1}$, of the plurality of voltage boost stages, of the charge pump circuit is connected to the gate terminal of the first flip-flop transistor.

11. The circuit according to claim 10, further comprising:
    a third flip-flop transistor having a gate terminal and a source terminal connected to ground;
    a fourth flip-flop transistor having a drain terminal connected to the output of the latch circuit and a gate terminal to receive the regulator signal; and a latch output inverter having an input connected to the output of the latch circuit and an output connected to the input of the inverter of the voltage boost stage $VBS_1$;

wherein the output of the inverter of the voltage boost stage $VBS_N$ of the charge pump circuit is connected to the gate terminal of the third flip-flop transistor.

12. The circuit according to claim 11, wherein the first, second, third and fourth flip-flop transistors and the latch circuit constitute a flip-flop circuit.

13. The circuit according to claim 1, wherein the first and second charge storing means each comprises a capacitor.

14. The circuit according to claim 12, wherein the inverters of the plurality of voltage boost stages and the flip-flop circuit constitute a loop oscillator with an odd number of inverting cycles.

15. A voltage boosting circuit, comprising:

an output terminal;

a first charge storing device;

a second charge storing device;

a first charging circuit to charge the first charge storing device to a first charge level;

a second charging circuit to charge the second charge storing device to a second charge level;

first means for coupling the first charge on the first charge storing device to the output terminal when an output potential value on the output terminal is less than a first predetermined value;

second means for coupling the first charge on the first charge storing device to the second charge storing device when the output potential value is not less than the first predetermined value; and third means for coupling the second charge on the second charge storing device to the output line when the second charge is greater than a second predetermined value.

16. The voltage boosting circuit as recited in claim 15, wherein the first coupling means comprise a first transistor to couple the first charge to the output terminal.

17. The voltage boosting circuit as recited in claim 15, wherein the second coupling means comprise a transistor to couple the first charge to the second charge storing device.

18. The voltage boosting circuit as recited in claim 16, wherein the second coupling means comprise a second transistor to couple the first charge to the second charge storing device.

19. A voltage generator for generating an output voltage, comprising:

a supply line;

an output line;

a plurality of N voltage boost stage $VBS_i$, wherein i=1 to N where N is an integer greater than 1, each voltage boost stage being connected to the supply line and to the output line, the plurality of voltage boost stages being connected in an order such that voltage boost stage $VBS_x$ is connected to voltage boost stage $VBS_{x+1}$, wherein x=1 to N−1;

a flip-flop having an output, a first input and a second input, the first and second inputs connected to voltage boost stage $VBS_N$; and an inverter having an input connected to the output of the flip-flop and an output connected to voltage boost stage $VBS_1$;

wherein each voltage boost stage $VBS_i$ includes a first control circuit that operates in a first mode of operation in a startup state of the voltage generator and a second control circuit that operates in a second mode of operation in a steady state of the voltage generator to generate the output voltage.

20. The voltage generator as recited in claim 19, wherein each voltage boost stage comprises:

a first charge storing device having a first terminal and a second terminal;

a second charge storing device having a third terminal and a fourth terminal;

wherein the first control circuit comprises a first charge transfer device, connected between the first terminal and the fourth terminal, to couple a first charge on the first charge storing device to the second charge storing device when a potential on the output line is not less than a first predetermined value; and wherein the second control circuit comprises a second charge transfer device, connected between the first terminal and the output line, to couple the first charge on the first charge storing device to the output line when the potential on the output line is less than the first predetermined value.

21. The voltage generator as recited in claim 20 wherein the second terminal of the first charge storing device of voltage boost stage $VBS_1$ is coupled to the output of the inverter.

22. The voltage generator as recited in claim 20, wherein the second terminal of the first charge storing device of voltage boost stage $VBS_N$ is coupled to the first input of the flip-flop and the third terminal of the second charge storing device of voltage boost stage $VBS_N$ is coupled to the second input of the flip-flop.

23. The voltage generator as recited in claim 20, wherein, for each voltage boost stage, the third terminal of the second charge storing device of voltage boost stage $VBS_x$ is coupled to the second terminal of the first charge storing device of voltage boost stage $VBS_{x+1}$, wherein x=1 to N−1.

24. A method for generating an output voltage on an output line from a supply voltage on a supply line, the output voltage being greater than the supply voltage, the method comprising steps of:

charging a first charge storing device to a first charge level;

charging a second charge storing device to a second charge level;

coupling the first charge on the first charge storing device to the output line when an output potential value on the output line is less than a first predetermined value;

coupling the first charge on the first charge storing device to the second charge storing device when the output potential value is not less than the first predetermined value; and coupling the second charge on the second charge storing device to the output line when the second charge is greater than a second predetermined value.

25. The method as recited in claim 24, further comprising steps of:

charging a third charge storing device to a third charge level;

charging a fourth charge storing device to a fourth charge level;

coupling the third charge on the third charge storing device to the output line when the output potential value is less than a third predetermined value;

coupling the third charge on the third charge storing device to the fourth charge storing device when the output potential is not less than the third predetermined value; and coupling the fourth charge on the fourth charge storing device to the output line when the fourth charge is greater than a fourth predetermined value.

26. The method as recited in claim 24, wherein the step of coupling the first charge to the output line further comprises a step of:

coupling the first charge to the output line through a native N-channel MOS low-threshold transistor having a drain terminal and a gate terminal connected together.

* * * * *